(12) United States Patent
Shah et al.

(10) Patent No.: US 6,329,068 B1
(45) Date of Patent: Dec. 11, 2001

(54) ROSIN-FATTY ACID VINYLIC POLYMERS AS MOISTURE VAPOR BARRIER COATINGS

(75) Inventors: Rajnikant Shah; Stanley C. Adams, both of Mt. Pleasant, SC (US)

(73) Assignee: Westvaco Corporation, New York, NY (US)

( * ) Notice: Subject to any disclaimer, the term of this patent is extended or adjusted under 35 U.S.C. 154(b) by 0 days.

(21) Appl. No.: 09/545,668

(22) Filed: Apr. 7, 2000

Related U.S. Application Data

(63) Continuation-in-part of application No. 09/174,398, filed on Oct. 14, 1998, now abandoned.

(51) Int. Cl.⁷ .................................................. B32B 23/08
(52) U.S. Cl. ............................................................. 428/514
(58) Field of Search ............................................... 428/514

(56) References Cited

U.S. PATENT DOCUMENTS

| | | |
|---|---|---|
| 3,480,578 | 11/1969 | Witt . |
| 3,716,389 | 2/1973 | Voskuil et al. . |
| 3,770,486 | 11/1973 | Hopermann . |
| 4,317,755 | 3/1982 | Gregory . |
| 4,414,370 | 11/1983 | Hamielec et al. . |
| 4,529,787 | 7/1985 | Schmidt et al. . |
| 4,546,160 | 10/1985 | Brand et al. . |
| 4,812,508 | 3/1989 | Makhlouf et al. . |
| 4,839,413 | 6/1989 | Kiehlbauch et al. . |
| 5,008,329 | 4/1991 | Abe et al. . |
| 5,216,064 | 6/1993 | Rivera et al. . |
| 5,336,438 * | 8/1994 | Schilling .......................... 252/311.5 |
| 5,596,032 * | 1/1997 | Schilling ................................ 524/60 |
| 6,172,149 * | 1/2001 | Shah .................................... 524/272 |

* cited by examiner

*Primary Examiner*—Paul R. Michl
(74) *Attorney, Agent, or Firm*—Daniel B. Reece, IV; Terry B. McDaniel

(57) ABSTRACT

This invention relates to novel rosin-fatty acid vinylic polymer compositions which exhibit properties that make them useful for formulating moisture vapor barrier coatings for paper and other cellulosic base materials. In particular, this invention relates to rosin-fatty acid vinylic polymer moisture barrier coatings obtained from the addition polymerization reaction of a mixture of rosin and fatty acid and a mixture of (meth)acrylic and vinylic monomers.

15 Claims, No Drawings

ROSIN-FATTY ACID VINYLIC POLYMERS AS MOISTURE VAPOR BARRIER COATINGS

This application is a continuation-in-part of our commonly assigned, U.S. patent application Ser. No. 09/174,398, filed Oct. 14, 1998, entitled "Rosin-Fatty Acid Styrene-Acrylic Polymers as Moisture Barrier Coatings", abandoned.

FIELD OF INVENTION

This invention relates to novel rosin-fatty acid vinylic polymer compositions which exhibit properties that make them useful for formulating moisture vapor barrier coatings for paper and other cellulosic base materials. In particular, this invention relates to rosin-fatty acid vinylic polymer moisture barrier coatings produced from the addition polymerization reaction of a mixture of rosin and fatty acid and a mixture of (meth)acrylic and vinylic monomers.

BACKGROUND OF THE INVENTION

Many packaged materials, such as detergents and potato chips, must maintain a substantially constant moisture content in order to prevent the development of undesirable characteristics (such as agglomeration of the detergent particles or a lack of brittleness of potato chips). When the material in which these types of products were packaged did not function as an effective moisture barrier, the shelf life of the product was shortened due to the moisture gain or loss by the product.

Currently, the moisture vapor barrier coatings most commonly employed by the packaging industry are polyvinylidene chloride (PVDC) and polyethylene. However, problems exist with both of these coatings. For example, the use of PVDC in certain coating applications requires the utilization of environmentally unfriendly solvents. Moreover, where solvents are not be used and an aqueous dispersion of PVDC is employed, the corrosive nature of the dispersion often damages the coating equipment. As for polyethylene, this material must be applied on the desired substrate via a relatively expensive extrusion process.

Often these coating are employed in two-step systems where a primer is used to seal the pores of the packing material and a top coat is utilized to provide additional moisture resistance (see generally U.S. Pat. No. 3,770,486 which is hereby incorporated by reference). However, the addition coating step required in these two-part systems adds to the expense of the process.

To address these problems, the packing industry is actively seeking an effective water-based moisture barrier coating that can be applied in one step.

The traditional process for producing a polymer resin is well-known (see generally U.S. Pat. Nos. 4,839,413 and 5,216,064, which is hereby incorporated by reference). Commonly a solution polymerization reaction is employed wherein a styrenic monomer and acrylic acid is mixed with a hydrocarbon solvent, a polymerization initiator, and a chain transfer agent. Upon completion of the reaction, the solution is stripped of the solvent to yield the polymer composition.

However, major problems exist with the traditional methods of producing such polymers. For example, these methods require the use of environmentally adverse hydrocarbon solvents. Moreover, as these solvents are not usable or desirable in water-based formulations, the solvents must be stripped from the resulting polymers (thereby causing a yield loss). This stripping step also adds expense to the process due to both the loss of yield and the energy consumed in performing the stripping. Also, these methods must utilize chain transfer agents to regulate the molecular weight of the resulting polymer.

Therefore, an object of this invention is to solve these major problems by disclosing a method of producing rosin-fatty acid vinylic polymer compositions which exhibit properties that make them useful for formulating moisture vapor barrier coatings for paper and other cellulosic base materials.

Another object of this invention is to disclose rosin-fatty acid vinylic polymer moisture vapor barrier coating compositions.

SUMMARY OF THE INVENTION

The objects of this invention are met via a method that employs rosin and fatty acid to act as solvents in the polymerization reaction of the acrylic monomers, thereby producing rosin-fatty acid vinylic polymer compositions which are useful as moisture vapor barrier coatings for paper and other cellulosic base materials. As this method does not require the use of hydrocarbon solvents, the need for solvent stripping is eliminated. Also, the polymerization reaction can be conducted at higher temperatures (i.e., up to boiling point of fatty acid) than traditional solution polymer methods, thereby allowing the practitioner to utilize smaller amounts of free radical initiators. Furthermore, the practitioner is able to regulate molecular weight without the use of chain transfer agents, thereby both reducing costs and avoiding the production of unpleasant odors associated with such agents. Moreover, the fatty acid and rosin can function as a reactive diluent to impart flexibility to the vinylic polymer.

DESCRIPTION OF THE PREFERRED EMBODIMENT

The rosin-fatty acid vinylic polymer moisture vapor barrier coating compositions are prepared by the process of:

(A) reacting in an addition polymerization reaction:
  (1) about 20.0% to about 60.0% by total weight of the reactants of a fatty acid rosin mixture comprising:
    (a) about 10.0% to about 90.0% by total weight of the fatty acid rosin mixture of fatty acid, and
    (b) about 10.0% to about 90.0% by total weight of the fatty acid rosin mixture of rosin; and
  (2) about 40.0% to about 80.0% by total weight of the reactants of a monomer mixture comprising:
    (a) about 15.0% to about 45.0% by total weight of the monomer mixture of a member selected from the group consisting of acrylic acid, methacrylic acid, and combinations thereof,
    (b) about 55.0% to about 85.0% by total weight of the monomer mixture of a member selected from the group consisting of vinylic monomers and combinations thereof,
    (c) about 0.5% to about 5.0% by total weight of the monomer mixture of a polymerization initiator,
    (d) up to about 4.0% by total weight of the monomer mixture of a chain transfer agent, and
    (e) up to about 30.0% by total weight of the monomer mixture of a hydrocarbon solvent; at a temperature in the range of about 135° C. to about 1750° C. to produce rosin-fatty acid vinylic polymer reaction products having a weight average molecular weight in the range of about 4,000 to about 12,000; and (B) dispersing the rosin-fatty acid yinylic polymer in water to produce the moisture vapor barrier coating composition.

Preferred rosin-fatty acid vinylic polymer moisture vapor barrier coating compositions are prepared by the process of:

(A) reacting in an addition polymerization reaction:
  (1) about 20.0% to about 60.0% by total weight of the reactants of a fatty acid rosin mixture comprising:
    (a) about 20.0% to about 50.0% by total weight of the fatty acid rosin mixture of fatty acid, and
    (b) about 50.0% to about 80.0% by total weight of the fatty acid rosin mixture of rosin; and
  (2) about 40.0% to about 80.0% by total weight of the reactants of a monomer mixture comprising:
    (a) about 20.0% to about 25.0% by total weight of the monomer mixture of a member selected from the group consisting of acrylic acid, methacrylic acid, and combinations thereof,
    (b) about 60.0% to about 70.0% by total weight of the monomer mixture of a member selected from the group consisting of vinylic monomers and combinations thereof,
    (c) about 1.0% to about 3.0% by total weight of the monomer mixture of a polymerization initiator,
    (d) about 0.5% to about 2.0% by total weight of the monomer mixture of a chain transfer agent, and
    (e) about 1.0% to about 4.0% by total weight of the monomer mixture of a hydrocarbon solvent;
at a temperature in the range of about 135° C. to about 175° C. to produce rosin-fatty acid vinylic polymer reaction products having a weight average molecular weight in the range of about 4,000 to about 12,000; and (B) dispersing the rosin-fatty acid yinylic polymer in water to produce the moisture vapor barrier coating composition.

The addition polymerization reaction used to produce the rosin-fatty acid vinylic polymer reaction products is a melt polymerization reaction in which no water is employed. Reaction temperatures suitable for use in the present method are within the range of about 135° C. to about 175° C.; with the preferred temperatures being in the range of about 140° C. to about 170° C. The rosin-fatty acid vinylic polymer reaction products are subsequently dispersed in water to produce the rosin-fatty acid vinylic polymer moisture vapor barrier coating compositions.

The rosin and fatty acid function as solvents in the polymerization reaction of the acrylic monomers. Additionally, while a portion of the fatty acid and the rosin component remains unreacted, some of the fatty acid and rosin becomes graft polymerized onto the acrylic. The resulting rosin-fatty acid vinylic polymers have a weight average molecular weight in the range of about 4,000 to about 12,000; with the preferred molecular weights being in the range of about 5,000 to about 11,000.

These resulting rosin-fatty acid vinylic polymers have characteristics which differ from the traditional melt blends of flake acrylic fatty acid rosin. For example, the low molecular weights of the rosin-fatty acid vinylic polymers enable the polymers to be neutralized at high solid levels while maintaining low viscosities. The low molecular weight coupled with the polymer's high levels of functional carboxyl units permits the formulation of moisture vapor barrier coatings which contain high amounts of functional polymers components while maintaining targeted viscosity levels for application purposes. The aqueous dispersions of such rosin-fatty acid vinylic polymers are well-suited for use as moisture vapor barrier coatings for paper and other cellulosic base materials.

Fatty acids which are suitable for use in the present method include those fatty acids which contain a range of carbon atoms from about $C_{12}$ to about $C_{24}$; with the preferred range being from about $C_{16}$ to $C_{20}$. It is further preferred that the fatty acid be vegetable or tall oil based. It is most preferred that the fatty acid be tall oil based and contain from about 15% to about 18% conjugated double bonds.

It is preferred to add from about 20% to about 50% by total weight of the fatty acid rosin mixture of fatty acid.

Rosins which are suitable for use in the present method include wood rosin, tall oil rosin, gum rosin, and the like. The use of tall oil rosin is preferred. It is further preferred to add from about 50% to about 80% by total weight of the fatty acid rosin mixture of rosin.

It is preferred to add from about 20% to about 25% by total weight of the monomer mixture of acrylic acid, methacrylic acid, and combinations thereof.

It is preferred to add from about 60% to about 70% by total weight of the monomer mixture of vinylic monomers. Suitable vinylic monomers include styrenic monomers, acrylic monomers, methacrylic monomers, and the like. It is preferred that the vinylic monomers be a mixture, preferably including at least one monoalkenyl aromatic monomer and at least one acrylic monomer. The monoalkenyl aromatic monomer to be employed includes, for example, alpha-methyl styrene, styrene, vinyl toluene, tertiary butyl styrene, ortho-chlorostyrene and mixtures thereof.

The term "acrylic monomer" as employed herein includes acrylic or methacrylic acid, esters of acrylic or methacrylic acid and derivatives and mixtures thereof. Examples of suitable acrylic monomers include the following methacrylate esters: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Other suitable acrylic monomers include methacrylic acid derivatives such as: methacrylic acid and its salts, methacrylonitrile, methacrylamide, N-methylmethacrylamide, N-ethylmethacrylamide, N,N-diethymethacrylamide, N,N-dimethylmethacrylamide, N-phenyl-methacrylamide, methacrolein, and the like.

Typical acrylate esters employed include methyl acrylate, ethyl acrylate, n-propyl acrylate, isopropyl acrylate, n-butyl acrylate, 2-ethylhexal acrylate, n-decyl acrylate, and the like.

Acrylic acid derivatives employed as the acrylic monomer include: acrylic acid and its salts, acrylonitrile, acrylamide, methyl alpha-chloroacrylate, methyl 2-cyanoacrylate, N-ethylacrylamide, N,N-diethylacrylamide, acrolein, and the like.

The present invention method is also applied to the preparation of copolymers from mixtures of two or more acrylic monomers such as termonomers and tetramonomers. It is also contemplated that mixtures of at least one acrylic monomer and at least one non-acrylic ethylenic monomer may be polymerized with monoalkenyl aromatic monomers in accordance with the present method.

Suitable ethylenic monomers include vinyl pyridine, vinyl pyrollidone, sodium crotonate, methyl crotonate, crotonic acid, maleic anhydride, and the like.

The type of polymerization initiator suitable for use in the present method is known in the art to depend upon the desired temperature for the reaction. Suitable initiators include, but are not limited to, the following: t-butyl peroxide, t-butyl peroxybenzoate, t-butyl peroctoate, cumene hydroperoxide, azobisisobutyronitrile, benzoyl peroxide, and combinations thereof. It is preferred to add from about 1.0% to about 3.0% by total weight of the monomer mixture of polymerization initiator.

Where desired, a chain transfer agent may be employed in the present method. Chain transfer agents which are suitable for use in the above reaction include, but are not limited to, the following: dodecyl mercaptan, mercaptoacetic acid, mercaptopropionic acid, octyl mercaptan, 2-mercaptoethanol, and combinations thereof. Where employed, it is preferred to use an amount of chain transfer agent in the range of from about 0.5% to about 2.0% by total weight of the monomer mixture of chain transfer agent.

Where desired, a hydrocarbon solvent may be employed in the present method. Suitable hydrocarbon solvents include aromatic solvents, aliphatic solvents, and combinations thereof.

Where employed, it is preferred to use an amount of hydrocarbon solvent in the range of about 1.0% to about 4.0% by total weight of the monomer mixture.

Rosin-fatty acid vinylic polymer compositions which are suitable for use as moisture vapor barrier coatings for ink and overprint applications have an acid number in the range of about 175 to about 500; with the preferred range being about 190 to about 230.

It is preferred to employ a bulk polymerization process for the addition polymerization reaction. The residence time for such bulk processes is commonly in the range of about 3 hours to about 10 hours. However, where desired the addition polymerization reaction may be conducted via the use of a continuous stirred polymerization process. The residence time for such continuous processes is commonly in the range of about 90 minutes to about 6 hours; with the preferred residence time being in the range of about 2 hours to about 3 hours.

As appreciated in the art, the exact components and properties of components desired for any coating application can vary and, therefore, routine experimentation may be required to determine the optional components and proportions of components for a given application and desired properties.

The following examples are provided to further illustrate the present invention and are not to be construed as limiting the invention in any manner.

EXAMPLE 1

A rosin-fatty acid vinylic polymer composition was prepared via the following method. A reactor vessel equipped with a thermometer, stirrer, monomer feed pump, and a blanket nitrogen intake line was charged at room temperature with a mixture of 200.0 grams of L-5 Fatty Acid (a tall oil fatty acid composition commercially available from Westvaco Corporation) and 200.0 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 183.0 grams of styrene, 183.0 grams of alpha-methyl styrene, 212.0 grams of acrylic acid, and 39.1 grams of di-tert-butyl peroxide. After the addition of Charge A was completed, the reaction mixture was held at 150° C. for an additional three hours. The temperature of the reaction mixture was then raised to 180° C. and vacuum was applied to remove any unreacted materials. The resulting rosin-fatty acid vinylic polymer (hereafter referred to as "Polymer No. 1") was allowed to cool prior to being evaluated (see Table I below).

A 23.0% solids solution of Polymer No. 1 was prepared in deionized water and neutralized with ammonium hydroxide. The resulting moisture vapor barrier coating formulation was evaluated and the results listed in Table I below.

EXAMPLE 2

A rosin-fatty acid vinylic polymer composition was prepared via the following method. A reactor vessel equipped with a thermometer, stirrer, monomer feed pump, a blanket nitrogen intake line was charged at room temperature with a mixture of 400.0 grams of stearic acid. The mixture was heated under a nitrogen blanket to 150° C. and held at that temperature, whereupon Charge A was added, with stirring, over a three hour period. Charge A consisted of a mixture of 183.0 grams of styrene, 91.0 grams of lauryl methacrylate, 91.0 grams of alpha methyl styrene, 212.0 grams of acrylic acid, and 22.3 grams of di-tert-butyl peroxide. After the addition of Charge A was completed, the reaction mixture was held at 150° C. for an additional three hours. The temperature of the reaction mixture was then raised to 180° C. and vacuum was applied to remove any unreacted materials. The resulting rosin-fatty acid vinylic polymer (hereafter referred to as "Polymer No. 2") was allowed to cool prior to being evaluated (see Table I below).

A 23.0% solids solution of Polymer No. 2 was prepared in deionized water and neutralized with ammonium hydroxide. The resulting moisture vapor barrier coating formulation was evaluated and the results listed in Table I below.

For comparison purposes, a series of moisture vapor barrier coating formulations were prepared wherein a standard rosin polymer derivative was substituted for the above-noted rosin-fatty acid vinylic polymers. These standard formulations had solids levels ranging from about 17% to about 27% solids in deionized water and were neutralized with ammonium hydroxide. The results of the evaluations are listed in Table I below.

TABLE I

Evaluations Of Moisture Vapor Barrier Coating Formulations

| Polymer | % Solids | Viscosity[1] | Bar No.[2] | MVTR[3] |
|---|---|---|---|---|
| Polymer No. 1 | 25.9 | 10.0 | 8 | 7.0 |
| Polymer No. 1 | 25.9 | 10.0 | 12 | 3.5 |
| Polymer No. 2 | 23.0 | 10.0 | 8 | 4.8 |

TABLE I-continued

Evaluations Of Moisture Vapor Barrier Coating Formulations

| Polymer | % Solids | Viscosity[1] | Bar No.[2] | MVTR[3] |
|---|---|---|---|---|
| Polymer No. 2 | 23.0 | 10.0 | 12 | 3.2 |
| SM-7054[4] | 26.0 | 13.5 | 8 | 15.5 |
| SM-7244[4] | 17.3 | 13.0 | 12 | 15.5 |
| SM-7274[4] | 26.4 | 9.0 | 8 | 11.4 |

[1]Number of seconds in a #3 Zahn cup.
[2]Coatings were drawn down by hand using either a #8 or #12 wire-wound Meyer bar onto 12-point C2S PRINTKOTE board (a coated paperboard commercially available from Westvaco Corporation).
[3]The moisture vapor transmission rate (MVTR) was determined using the TAPPI Test Method T-448 om-89 under conditions of 72° C. and 50% relative humidity.
[4]JONREZ SM-705, JONREZ SM-724, and JONREZ SM-727 are water-dispersable rosin ester polymer compositions commercially available from Westvaco Corporation.

EXAMPLE 3

A rosin-fatty acid vinylic polymer composition suitable for use in formulating moisture vapor barrier coatings was prepared via the followinig method. A reactor vessel equipped with a thermometer, stirrer, monomer feed pump, a blanket nitrogen intake line was charged at room temperature with a mixture of 360.0 grams of L-5 Fatty Acid (a tall oil fatty acid composition commercially available from Westvaco Corporation) and 40.0 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 340.0 grams of styrene, 260.0 grams of acrylic acid, 14.0 grams of di-tert-butyl peroxide, and 42.0 grams of cumene hydroperoxide. After the addition of Charge A was completed, the reaction mixture was held at 150° C. for an additional hour. At that time 4.0 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 3") was allowed to cool prior to being evaluated (see Table II below).

EXAMPLE 4

A rosin-fatty acid vinylic polymer composition suitable for use in formulating moisture vapor barrier coatings was prepared via the following method. A reactor vessel equipped with a thermometer, stirrer, monomer feed pump, a blanket nitrogen intake line was charged at room temperature with a mixture of 360.0 grams of L-5 Fatty Acid (a tall oil fatty acid composition commercially available from Westvaco Corporation) and 40.0 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420.0 grams of styrene, 180.0 grams of acrylic acid, 28.0 grams of di-tert-butyl peroxide, and 28.0 grams of cumene hydroperoxide. After the addition of Charge A was completed, the reaction mixture was held at 150° C. for an additional hour. At that time 4.0 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 4") was evaluated (see Table II below).

EXAMPLE 5

A rosin-fatty acid vinylic polymer composition suitable for use in formulating moisture vapor lo barrier coatings was prepared via the following method. A reactor vessel equipped with a thermometer, stirrer, monomer feed pump, a blanket nitrogen intake line was charged at room temperature with a mixture of 200.0 grams of L-5 Fatty Acid (a tall oil fatty acid composition commercially available from Westvaco Corporation) and 200.0 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 380.0 grams of styrene, 220.0 grams of acrylic acid, 21.0 grams of di-tert-butyl peroxide, and 35.0 grams of cumene hydroperoxide. After the addition of Charge A was completed, the reaction mixture was held at 150° C. for an additional hour. At that time 4.0 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 5") was evaluated (see Table II below).

EXAMPLE 6

A rosin-fatty acid vinylic polymer composition suitable for use in formulating moisture vapor barrier coatings was prepared via the following method. A reactor vessel equipped with a thermometer, stirrer, monomer feed pump, a blanket nitrogen intake line was charged at room temperature with a mixture of 280.0 grams of L-5 Fatty Acid (a tall oil fatty acid composition commercially available from Westvaco Corporation) and 120.0 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 420.0 grams of styrene, 180.0 grams of acrylic acid, 14.0 grams of di-tert-butyl peroxide, and 42.0 grams of cumene hydroperoxide. After the addition of Charge A was completed, the reaction mixture was held at 150° C. for an additional hour. At that time 4.0 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 6") was evaluated (see Table II below).

EXAMPLE 7

A rosin-fatty acid vinylic polymer composition suitable for use in formulating moisture vapor barrier coatings was prepared via the following method. A reactor vessel equipped with a thermometer, stirrer, monomer feed pump, a blanket nitrogen intake line was charged at room temperature with a mixture of 280.0 grams of L-5 Fatty Acid (a tall oil fatty acid composition commercially available from Westvaco Corporation) and 120.0 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 340.0 grams of styrene, 260.0 grams of acrylic acid, 14.0 grams of di-tert-butyl peroxide, and 42.0 grams of cumene hydroperoxide. After the addition of Charge A was completed, the reaction mixture was held at 150° C. for an additional hour. At that time 4.0 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 7") was evaluated (see Table II below).

EXAMPLE 8

A rosin-fatty acid vinylic polymer composition suitable for use in formulating moisture vapor barrier coatings was prepared via the following method. A reactor vessel equipped with a thermometer, stirrer, monomer feed pump, a blanket nitrogen intake line was charged at room temperature with a mixture of 200.0 grams of L-5 Fatty Acid (a tall oil fatty acid composition commercially available from Westvaco Corporation) and 200.0 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 380.0 grams of styrene, 220.0 grams of acrylic acid, 8.0 grams of di-tert-butyl peroxide, and 8.0 grams of cumene hydroperoxide.

After the addition of Charge A was completed, the reaction mixture was held at 150° C. for an additional hour. At that time 4.0 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 8") was allowed to cool prior to being evaluated (see Table II below).

EXAMPLE 9

A rosin-fatty acid vinylic polymer composition suitable for use in formulating moisture vapor barrier coatings was prepared via the following method. A reactor vessel equipped with a thermometer, stirrer, monomer feed pump, a blanket nitrogen intake line was charged at room temperature with a mixture of 240.0 grams of L-5 Fatty Acid (a tall oil fatty acid composition commercially available from Westvaco Corporation) and 160.0 grams of Rosin SS (a tall oil rosin composition commercially available from Westvaco Corporation). The mixture was heated under a nitrogen blanket to 150° C. and held at that temperature, whereupon Charge A was added, with stirring, over a three hour period. Charge A consisted of a mixture of 380.0 grams of styrene, 220.0 grams of acrylic acid, 7.0 grams of di-tert-butyl peroxide, and 20.0 grams of cumene hydroperoxide. After the addition of Charge A was completed, the reaction mixture was held at 150° C. for an additional hour. At that time 4.0 grams of cumene hydroperoxide was added and the reaction mixture was held at 150° C. for an additional two hours. The temperature of the reaction mixture was then raised to 180° C. and vacuum was applied to remove any unreacted materials. The resulting rosin-fatty acid vinylic polymer (hereafter referred to as "Polymer No. 9") was allowed to cool prior to being evaluated (see Table II below).

TABLE II

Properties Of Rosin-Fatty Acid Vinylic Polymer Compositions

| Polymer | MW[1] | Acid No. | Softening Pt (° C.) |
|---|---|---|---|
| Polymer 3 | 5,894 | 249 | 81 |
| Polymer 4 | 4,913 | 197 | 76 |
| Polymer 5 | 7,314 | 235 | 111 |
| Polymer 6 | 7,588 | 199 | 85 |
| Polymer 7 | 8,400 | 247 | 104 |
| Polymer 8 | 7,613 | 138 | 108 |
| Polymer 9 | 7,873 | 237 | 101 |
| H-2702[2] | 7,000 | 206 | 140 |
| H-2701[2] | 2,500 | 210 | 135 |
| H-2702[2] | 7,000 | 206 | 155 |
| M-101[3] | 7,000 | 204 | 134 |
| J-678[4] | 8,400 | 205 | 145 |
| J-682[4] | 1,500 | 243 | 105 |
| J-690[4] | 16,000 | 240 | 136 |
| C-1162[5] | 2,300 | 216 | 125 |

[1]Weight Average Molecular Weight.
[2]JONREZ H-2702 and H-2701 are acrylic resins commercially available from Westvaco Corporation.
[3]MOREZ M-101 is an acrylic resin commercially available from Morton International Inc.
[4]JONCRYL J-678, J-682, and J-690 are acrylic resins commercially available from S. C. Johnson and Son, Inc.
[5]CARBOSET C-1162 is an acrylic resin commercially available from B. F. Goodrich.

As the data in Table II shows, the present rosin-fatty acid vinylic polymers can be tailored to have chemical characteristics and properties similar to commonly employed, commercially available polymer compositions.

EXAMPLE 10

A rosin-fatty acid vinylic polymer composition suitable for use in formulating moisture vapor barrier coatings was prepared via the following method. A reactor vessel equipped with a thermometer, stirrer, monomer feed pump, a blanket nitrogen intake line was charged at room temperature with a mixture of 475.0 grams of L-5 Fatty Acid (a tall oil fatty acid composition commercially available from Westvaco Corporation), 185.0 grams of Rosin SS (a tall oil rosin composition commercially available from Westvaco Corporation), 45.0 grams of toluene, and 0.6 grams of hypophosphoric acid. The mixture was heated under a nitrogen blanket to 150° C. and held at that temperature, whereupon Charge A was added, with stirring, over a three hour period. Charge A consisted of a mixture of 946.0 grams of styrene, 594.0 grams of acrylic acid, and 38.5 grams of di-tert-butyl peroxide. After the addition of Charge A was completed, the reaction mixture was held at 150° C. for an additional hour. At that time 4.4 grams of di-tert-butyl peroxide was added and the reaction mixture was held at 150° C. for an additional two hours. The temperature of the reaction mixture was then raised to 180° C. and vacuum was applied to remove any unreacted materials to produce the rosin-fatty acid vinylic polymer.

EXAMPLE 11

A rosin-fatty acid vinylic polymer composition suitable for use in formulating moisture vapor barrier coatings was prepared via the following method. A reactor vessel equipped with a thermometer, stirrer, monomer feed pump, a blanket nitrogen intake line was charged at room temperature with a mixture of 450.0 grams of L-5 Fatty Acid (a tall oil fatty acid composition commercially available from Westvaco Corporation), 450.0 grams of Rosin SS (a tall oil rosin composition commercially available from Westvaco Corporation), and 1.5 grams of hypophosphoric acid. The mixture was heated under a nitrogen blanket to 150° C. and held at that temperature, whereupon Charge A was added, with stirring, over a three hour period. Charge A consisted of a mixture of 427.5 grams of styrene, 427.5 grams of (alpha) methyl styrene, 495.0 grams of acrylic acid, 16.0 grams of di-tert-butyl peroxide, and 95.0 grams of cumene hydroperoxide. After the addition of Charge A was completed, the reaction mixture was held at 150° C. for an additional hour. At that time 9.0 grams of cumene hydroperoxide was added and the reaction mixture was held at 150° C. for an additional two hours. The temperature of the reaction mixture was then raised to 180° C. and vacuum was applied to remove any unreacted materials to produce the rosin-fatty acid vinylic polymer.

EXAMPLE 12

A rosin-fatty acid vinylic polymer composition suitable for use in formulating moisture vapor barrier coatings was prepared via the following method. A reactor vessel equipped with a thermometer, stirrer, monomer feed pump, a blanket nitrogen intake line was charged at room temperature with a mixture of 200.0 grams of L-5 Fatty Acid (a tall oil fatty acid composition commercially available from Westvaco Corporation), 200.0 grams of Rosin SS (a tall oil rosin composition commercially available from Westvaco Corporation), 30.0 grams of toluene, and 0.5 grams of hypophosphoric acid. The mixture was heated under a nitrogen blanket to 150° C. and held at that temperature, whereupon Charge A was added, with stirring, over a three hour period. Charge A consisted of a mixture of 340.0 grams of styrene, 260.0 grams of acrylic acid, 10.0 grams of di-tert-butyl peroxide, and 7.0 grams of cumene hydroperoxide. After the addition of Charge A was completed, the reaction mixture was held at 150° C. for an additional hour. At that time 4 grams of cumene hydroperoxide was added and the reaction mixture was held at 150° C. for an additional two hours. The temperature of the reaction mixture was then raised to 180° C. and vacuum was applied to remove any unreacted materials to produce the rosin-fatty acid vinylic polymer.

EXAMPLE 13

A rosin-fatty acid vinylic polymer composition suitable for use in formulating moisture vapor barrier coatings was prepared using a continuous stirred tank reactor. A resin pump continuously fed (at a rate of 7.5 grams per minute) a feed mixture of 221.0 grams of L-5 Fatty Acid (a tall oil fatty acid composition commercially available from Westvaco Corporation), 220.6 grams of Rosin SS (a tall oil rosin composition commercially available from Westvaco Corporation), 316.1 grams of styrene, 316.1 grams of (alpha)methyl styrene, 397.4 grams of acrylic acid, and 28.8 grams of di-tert-butyl peroxide into a reactor heated to a temperature of 160° C. The resulting rosin-fatty acid vinylic polymer had a molecular weight of 10,350.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:
1. A method for improving the moisture vapor barrier properties of a cellulosic based substrate sheet which comprises coating at least one surface of the sheet with a rosin-fatty acid vinylic polymer moisture vapor barrier coating composition prepared by the process of:
   (A) reacting in an addition polymerization reaction:
      (1) about 20.0% to about 60.0% by total weight of the reactants of a fatty acid rosin mixture comprising:
         (a) about 10.0% to about 90.0% by total weight of the fatty acid rosin mixture of fatty acid, and
         (b) about 10.0% to about 90.0% by total weight of the fatty acid rosin mixture of rosin; and
      (2) about 40.0% to about 80.0% by total weight of the reactants of a monomer mixture comprising:
         (a) about 15.0% to about 45.0% by total weight of the monomer mixture of a member selected from the group consisting of acrylic acid, methacrylic acid, and combinations thereof,
         (b) about 55.0% to about 85.0% by total weight of the monomer mixture of a member selected from the group consisting of vinylic monomers and combinations thereof,
         (c) about 0.5% to about 5.0% by total weight of the monomer mixture of a polymerization initiator,
         (d) up to about 4.0% by total weight of the monomer mixture of a chain transfer agent, and
         (e) up to about 30.0% by total weight of the monomer mixture of a hydrocarbon solvent;
   at a temperature in the range of about 135° C. to about 175° C. to produce a rosin-fatty acid vinylic polymer having a weight average molecular weight in the range of about 4,000 to about 12,00; and
   (B) dispersing the rosin-fatty acid vinylic polymer in water.

2. The method of claim 1 wherein the rosin-fatty acid vinylic polymer moisture vapor barrier coating composition is prepared by the process of:
   (A) reacting in an addition polymerization reaction:
      (1) about 20.0% to about 60.0% by total weight of the reactants of a fatty acid rosin mixture comprising:
         (a) about 20.0% to about 50.0% by total weight of the fatty acid rosin mixture of fatty acid, and
         (b) about 50.0% to about 80.0% by total weight of the fatty acid rosin mixture of rosin; and
      (2) about 40.0% to about 80.0% by total weight of the reactants of a monomer mixture comprising:
         (a) about 20.0% to about 25.0% by total weight of the monomer mixture of a member selected from the group consisting of acrylic acid, methacrylic acid, and combinations thereof,
         (b) about 60.0% to about 70.0% by total weight of the monomer mixture of a member selected from the group consisting of vinylic monomers and combinations thereof,
         (c) about 1.0% to about 3.0% by total weight of the monomer mixture of a polymerization initiator,
         (d) about 0.5% to about 2.0% by total weight of the monomer mixture of a chain transfer agent, and
         (e) about 1.0% to about 4.0% by total weight of the monomer mixture of a hydrocarbon solvent;
   at a temperature in the range of about 135° C. to about 175° C. to produce rosin-fatty acid vinylic polymer reaction products having a weight average molecular weight in the range of about 4,000 to about 12,00; and
   (B) dispersing the rosin-fatty acid vinylic polymer in water.

3. The method of claim 1 wherein the fatty acid is a member selected from the group consisting of fatty acids containing from 12 to 24 carbon atoms and combinations thereof.

4. The method of claim 1 wherein the rosin is a member selected from the group consisting of tall oil rosin, wood rosin, gum rosin, and combinations thereof.

5. The method of claim 1 wherein the vinylic monomer is a member selected from the group consisting of styrenic monomers, acrylic monomers, methacrylic monomers, and combinations thereof.

6. The method of claim 1 wherein the vinylic monomer is a mixture containing at least one monoalkenyl aromatic monomer and at least one acrylic monomer.

7. The method of claim 6 wherein the monoalkenyl aromatic monomer is a member selected from the group consisting of alpha-methyl styrene, styrene, vinyl toluene, tertiary butyl styrene, ortho-chlorostyrene, and combinations thereof.

8. The method of claim 6 wherein the acrylic monomer is a member selected from the group consisting of methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzvl methacrylate, allyl methacrylate, 2-n-butoxyethyl methacrylate, 2-chloroethyl methacrylate, sec-butyl-metnacrylate, tert-butyl methacrylate, 2-ethybutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate, tetrahydropyranyl methacrylate, methacrylic acid and its salts, methacrylonitrile, methacrylamide, N-methylmethacrylamide, N-ethylmethacrylaamide, N,N-diethymethacrylamide, N,N-dimethylmethacrylamide, N-phenyl-methacrylamide, methacrolein, methyl acrylate, ethyl acrylate, n-propyl acrylate, isopropyl acrylate, n-butyl acrylate, n-decyl acrylate, acrylic acid and its salts, acrylonitrile, acrylamide, methyl alpha-chloroacrylate, methyl 2-cyanoacrylate, N-ethylacrylamide, N,N-diethylacrylamide, acrolein, and combinations thereof.

9. The method of claim 1 wherein the polymerization initiator is a member selected from the group consisting of t-butyl peroxide, t-butyl peroxybenzoate, t-butyl peroctoate, cumene hydroperoxide, azobisisobutyronitrile, benzoyl peroxide, and combinations thereof.

10. The method of claim 1 wherein the chain transfer agent is a member selected from the group consisting of dodecyl mercaptan, mercaptoacetic acid, mercaptopropionic acid, octyl mercaptan, 2-mercaptoethanol, and combinations thereof.

11. The method of claim 1 wherein the hydrocarbon solvent is a member selected from the group consisting of aromatic solvents, aliphatic solvents, and combinations thereof.

12. The method of claim 1 wherein the addition polymerization reaction occurs at a temperature in the range of about 140° C. to about 170° C.

13. The method of claim 1 wherein the rosin-fatty vinylic polymer has a weight average molecular weight in the range of about 5,000 to about 11,000.

14. The method of claim 1 wherein the composition has an acid number from about 175 to about 500.

15. The method of claim 1 wherein the composition has an acid number from about 190 to about 230.

* * * * *

UNITED STATES PATENT AND TRADEMARK OFFICE
CERTIFICATE OF CORRECTION

PATENT NO.   : 6,329,068 B1                                       Page 1 of 1
DATED        : December 11, 2001
INVENTOR(S)  : Rajnikant Shah and Stanley C. Adams It is certified that error appears in the above-identified patent and that said Letters Patent is hereby corrected as shown below:

Column 2,
Line 61, delete "1750° C." and substitute therefor -- 175° C. --.

Column 7,
Line 7, in Table 1, 1st column, delete "SM7054$^4$" and substitute therefor -- SM705$^4$ --.
Line 8, in Table 1, 1st column, delete "SM7244$^4$" and substitute therefor -- SM724$^4$ --.
Line 9, in Table 1, 1st column, delete "SM7274$^4$" and substitute therefor -- SM727$^4$ --.

Column 8,
Line 9, in delete "lo".

Column 12,
Line 33, delete "12,00;" and substitute therefor -- 12,000; --.
Line 65, delete "12,00;" and substitute therefor -- 12,000; --.

Column 13,
Line 29, delete "benzvl" and substitute therefor -- benzyl --.
Line 32, delete "metnacrylate," and substitute therefor -- methacrylate, --.

Column 14,
Line 5, delete "N-ethylmethacrylaamide," and substitute therefor -- N-ethylmethacrylamide, --.

Signed and Sealed this

Fourteenth Day of May, 2002

Attest:

JAMES E. ROGAN
*Attesting Officer*   *Director of the United States Patent and Trademark Office*